United States Patent

Koizumi

[11] Patent Number: 5,956,670
[45] Date of Patent: Sep. 21, 1999

[54] SPEECH REPRODUCING DEVICE CAPABLE OF REPRODUCING LONG-TIME SPEECH WITH REDUCED MEMORY

[75] Inventor: Fumiaki Koizumi, Tokyo, Japan

[73] Assignee: NEC Corporation, Tokyo, Japan

[21] Appl. No.: 08/635,503

[22] Filed: Apr. 22, 1996

[30] Foreign Application Priority Data

Apr. 24, 1995 [JP] Japan .................................. 7-123177

[51] Int. Cl.⁶ .................................................. G10L 5/02
[52] U.S. Cl. ............................................ 704/201; 704/211
[58] Field of Search .................. 395/2.2, 2.1, 2.91–2.95; 704/201, 211

[56] References Cited

U.S. PATENT DOCUMENTS 4,769,642  9/1988  Davis et al. ..................... 340/825.44

FOREIGN PATENT DOCUMENTS 1-116699  5/1989  Japan .
92 06467  4/1992  WIPO .

OTHER PUBLICATIONS

*Patent Abstracts of Japan*, vol. 018, No. 309 (P–1753), Jun. 13, 1994 & JP 6–067700, Mar. 11, 1994.
*Patent Abstracts of Japan*, vol. 018, No. 536 (P–1811), Oct. 12, 1994 & JP 6–186975, Jul. 8, 1994.

Primary Examiner—David R. Hudspeth
Assistant Examiner—Michael N. Opsasnick
Attorney, Agent, or Firm—Ostrolenk, Faber, Gerb & Soffen, LLP

[57] ABSTRACT

A speech reproducing device includes a data processing unit for processing a received radio frequency signal to generate speech data, a memory for storing the speech data on a basis of several speech frames, each having a predetermined length, a speech decoding unit for decoding speech data stored in the memory to generate a speech signal, a speech reproducing unit for reproducing and outputting speech based on a generated decoded speech signal and a telephone control unit for controlling operation of each unit to read speech frames in the memory while appropriately thinning out them as necessary to reproduce speech.

12 Claims, 4 Drawing Sheets

SPEECH REPRODUCING DEVICE CAPABLE OF REPRODUCING LONG-TIME SPEECH WITH REDUCED MEMORY

BACKGROUND OF THE INVENTION

1. Field of the Invention

The present invention relates to a speech reproducing device for controlling processing for reproducing received speech data and, more particularly, to a speech reproducing device in which the amount of memory needed is reduced so as to reproduce long-time speech such as conversation.

2. Description of the Related Art

One conventional speech reproducing device for controlling operation in a speech reproducing system which reproduces received speech data is disclosed in, for example, Japanese Unexamined Patent Publication (Kokai) No. Heisei 1-116699. The structure of the speech reproducing device described in this literature is shown in FIG. 4.

In this conventional speech reproducing device, a discrimination circuit 101 detects an input from a microphone 100 and supplies a write instruction signal to a memory 102 to store the input from the microphone 100 in the memory 102 in response to a predetermined clock signal. Then, a reproduction speed selecting switch 103 selects a reproduction speed of speech data stored in the memory 102 and the speech data is read at the selected speed based on a clock whose speed is determined by a read instruction signal output by a reproduction control circuit 104. In other words, speech data written on the memory 102 is reproduced at an arbitrary speed through control of the clock speed at which it is read out of speed determined by the reproduction speed selecting switch.

The above-descried conventional speech reproducing device, however, has a drawback that the capacity of the memory 102 is not sufficient for recording speech data of common conversations.

More specifically, the above-described conventional speech reproducing device is intended for storing speech data of a single, relatively short period of conversation and is therefore practical in terms of that objective. However, it is not unusual for common conversation to take several tens of minutes. Speech data of such conversation is so enormous that the memory 102 used in the above speech reproducing device does not have sufficient capacity to store the entire part of such conversation.

SUMMARY OF THE INVENTION

An object of the present invention is to provide a speech reproducing device in which a shortage of memory capacity caused by an overflow in speech data is eliminated, making it possible to use the device in connection with common long-time conversations.

According to one aspect of the invention, a device for reproducing speech from a received radio frequency signal, comprising:

(A) data processing means for processing a received radio frequency signal representative of a conversation, said data processing means processing said received radio frequency signal to generate speech data comprising a plurality of consecutive speech frames, each of said speech frames being representative of a respective time segment of said received radio frequency signal, each of said time segments being of equal length;

(B) storing means for storing each consecutive said speech frame generated by said data processing means; and (C) selecting means for selecting a magnification ratio indicative of the speed at which said conversation is to be reproduced;

(D) sound reproduction means for reproducing said conversation, said sound reproduction means comprising:

(1) deleting means for deleting a number of speech frames, and therefor a segment of said conversation, stored in said storing means at a rate which is determined by said magnification ratio, whether or not a given set of speed frame are deleted being and which is independent of whether or not a segment of said conversation corresponding to said set of speech frames corresponds to a silent portion of said conversation; and (2) reproducing means for reproducing said conversation by converting those of said speech frames which are not deleted into an audible signal.

According to another aspect of the invention, a process for reproducing speech from a received radio frequency signal comprises:

(A) processing a received radio frequency signal representative of a conversation so as to generate speech data comprising a plurality of consecutive speech frames, each of said speech frame being representative of a respective time segment of said received radio frequency signal, each of said time segments being of equal length;

(B) storing each consecutive said speech frame generated by said data processing means; and (C) reproducing said conversation by:

(1) deleting a number a of said stored speech frames, and therefore a segment of said conversation, at a rate which is determined by a magnification ratio indicative of the speech at which said conversation is to be reproduced, said speed being independent of whether or not said segment of said conversation corresponds to a silent portion of said conversation;

(2) reproducing said conversation by converting those of said speech frames which are not deleted into an audible signal.

In the preferred construction, the control means comprises setting means for setting a thinning-out rate of said speech frames by specifying a speech reproduction speed in said speech reproducing means.

In the preferred construction, the control means comprises setting means for setting a thinning-out rate of said speech frames by specifying a speech reproduction speed in said speech reproducing means, read control means for reading the speech frames in said storing means while thinning out them, and sending the read speech frames to said speech decoding means in accordance with the setting by said setting means, and reproduction control means for controlling said speech reproducing means to reproduce speech while complementing a part of the speech frames thinned out by said read control means in accordance with the setting by said setting means, the read control means reads a speech frame positioned at the top of the speech frames in said storing means, deletes speech frames following said read speech frame in accordance with a thinning-out rate set by said setting means, and shifts speech data subsequent to said deleted speech frames to the top of said storing means.

In another preferred construction, the control means comprises setting means for setting a thinning-out rate of said speech frames by specifying a speech reproduction speed in said speech reproducing means by a ratio to a normal reproduction speed, read control means for reading the speech frames stored in said storing means while thinning out them, and sending the read speech frames to said speech decoding means in accordance with the setting by said setting means, and reproduction control means for controlling said speech reproducing means to reproduce speech while complementing a part of the speech frames thinned out by said read control means in accordance with the setting by said setting means, the read control means reads a speech frame positioned at the top of the speech data stored in said storing means, deletes as many speech frames as the number obtained by subtracting the numerical value of 1 from a value of said ratio to a normal reproduction speed set by said setting means out of the speech frames following said read speech frame, and shifts a speech frame subsequent to said deleted speech frames to the top of said storing means.

In the above-mentioned construction, the control means comprises setting means for setting a thinning-out rate of said speech frames by specifying a speech reproduction speed in said speech reproducing means, read control means for reading the speech frames stored in said storing means while thinning out them, and sending the read speech frames to said speech decoding means in accordance with the setting by said setting means, and reproduction control means for controlling said speech reproducing means to reproduce speech while complementing a part of the speech frames thinned out by said read control means in accordance with the setting by said setting means, the read control means reads a speech frame positioned at the top of the speech frames stored in said storing means, deletes as many speech frames as the number according to the thinning-out rate set by said setting means out of the speech frames following said read speech frame, and shifts a speech frame subsequent to said deleted speech frames to the top of said storing means, and the reproduction control means extends a speech reproduction time by changing the speech reproduction speed of said speech reproducing means in accordance with the speech reproduction speed specified by said setting means to complement a part of the speech frames thinned out by said read control means.

Also, the control means comprises setting means for setting a thinning-out rate of said speech frames by specifying a speech reproduction speed in said speech reproducing means, read control means for reading the speech frames stored in said storing means while thinning out them, and sending the read speech frames to said speech decoding means in accordance with the setting by said setting means, and reproduction control means for controlling said speech reproducing means to reproduce speech while complementing a part of the speech frames thinned out by said read control means in accordance with the setting by said setting means, the read control means reads a speech frame positioned at the top of the speech frames stored in said storing means, deletes as many speech frames following said read speech frame as the number according to the thinning-out rate set by said setting means, and shifts a speech frame subsequent to said deleted speech frames to the top of said storing means, and the reproduction control means copies and arranges one speech frame of the speech signal decoded by said speech decoding means in accordance with the speech reproduction speed specified by said setting means to complement the part of the speech frames thinned out by said read control means.

In another preferred construction, the control means comprises setting means for setting a thinning-out rate of said speech frames by specifying a speech reproduction speed in said speech reproducing means by a ratio to a normal reproduction speed, read control means for reading the speech frames stored in said storing means while thinning out them, and sending the read speech frames to said speech decoding means in accordance with the setting by said setting means, and reproduction control means for controlling said speech reproducing means to reproduce speech while complementing a part of the speech frames thinned out by said read control means in accordance with the setting by said setting means, and the read control means reads a speech frame positioned at the top of the speech data stored in said storing means, deletes as many speech frames as the number obtained by subtracting the numerical value of 1 from a value of said ratio to a normal reproduction speed set by said setting means out of the speech frames following said read speech frame, and shifts a speech frame subsequent to said deleted speech frames to the top of said storing means, and the reproduction control means copies one speech frame of the speech signal decoded by said speech decoding means as many as the number obtained by subtracting the numerical value of 1 from a value of said ratio to a normal reproduction speed specified by said setting means and arranges the copied signals into said decoded speech signal to complement a part of the speech frames thinned out by said read control means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

Preferred embodiments of the present invention will be descried in detail with reference to the accompanying drawings.

Figure 1:
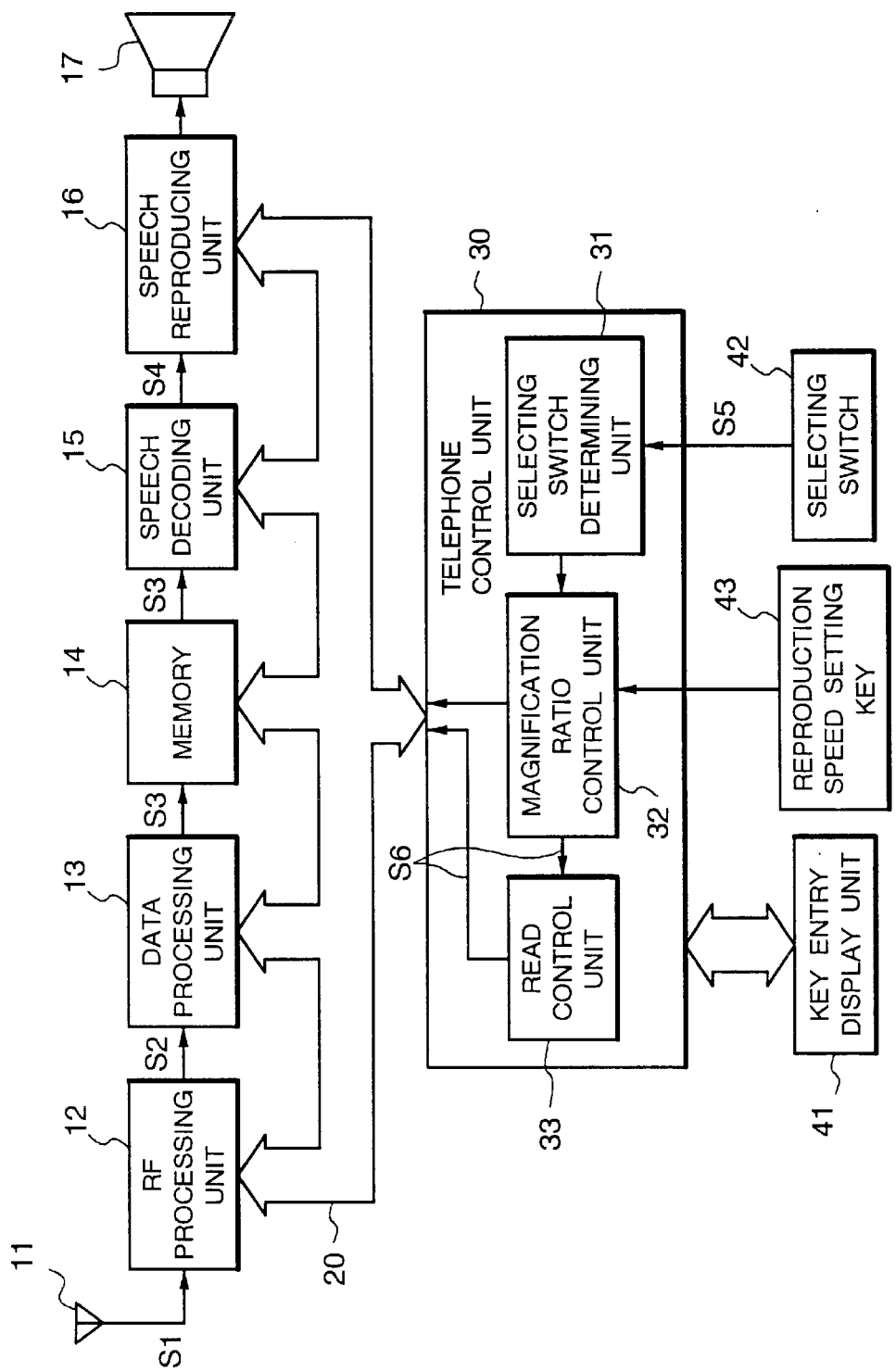
FIG. 1 is a block diagram showing structure of a speech reproducing device according to a first embodiment of the present invention.

FIG. 1 is a block diagram showing the structure of a speech reproducing device according to a first embodiment of the present invention. The present embodiment will be described with respect to a case where a speech reproducing device is applied to a portable telephone.

As shown in FIG. 1, the speech reproducing device of the present embodiment includes a radio frequency (RF) processing unit 12, a data processing unit 13, a memory 14 and a speech decoding unit 15 for processing a radio frequency (RF) signal S1 received by an antenna 11 to generate a speech signal, a speech reproducing unit 16 and a speaker 17 for outputting speech based on a reproduced speech signal, a telephone control unit 30 connected to each unit for controlling the same through a bus 20, and a key entry display unit 41, a selecting switch 42 and a reproduction speed setting key 43 for setting the telephone control unit 30 in a predetermined manner. In the figure, illustration is made only of characteristic components of the present embodiment and that of the other components is omitted.

The RF processing unit 12, which is implemented by a program-controlled CPU or the like, demodulates a received RF signal S1 to generate an information signal S2 under control of the telephone control unit 30. The information signal S2 is applied to the data processing unit 13.

The data processing unit 13, which is implemented by a program-controlled CPU or the like, executes such processing as equalization and error correction in response to the information signal S2 sent from the RF processing unit 12 to generate speech data S3 under control of the telephone control unit 30. Generated speech data S3 is output to the memory 14.

The memory 14, which is implemented by a main storage device such as an RAM, reads and stores several frames of the speech data S3 sent from the data processing unit 13 under control the telephone control unit 30.

The speech decoding unit 15, which is implemented by a program-controlled CPU or the like, reads coded speech data S3 stored in the memory 14 and decodes the read data at a preset speed to generate a speech signal S4 under control of the telephone control unit 30. Generated speech signal S4 is output to the speech reproducing unit 16.

The speech reproducing unit 16, which is implemented by a program-controlled CPU or the like, reproduces the speech signal S4 sent from the speech decoding unit 15 at a preset speed to output speech through the speaker 17. The speaker 17, which is a component provided simply for outputting speech, can be replaced by other components for outputting speech such as an earphone.

The selecting switch 42 is used to change the speed with which the speech decoding unit 15 decodes the speech data S3 and a speed with which the speech reproducing unit 16 reproduces the speech signal S4. When the selecting switch 42 is turned on, a speed change signal S5 is applied to the telephone control unit 30. The signal S5 indicates a desired change of a decoding speed of the speech data S3 or a reproduction speed of the speech signal S4.

The reproduction speed setting key 43 is used to set a desired reproduction speed which will be used by speech decoding unit 15 and speech reproducing unit 16 when the selecting switch 42 is placed on the ON state. Setting of the value of the speech reproduction speed can be executed in an arbitrary manner. For example, the value is set by specifying a fraction or a percentage of a normal reproduction speed.

The key entry display unit 41, which is implemented by a display device or the like, is for enabling an operator to observe whether the selecting switch 42 is ON or OFF and to observe the contents entered by the reproduction speed setting key 43 for reliable setting operation.

The telephone control unit 30 includes a selecting switch determining unit 31 for accepting an input from the selecting switch 42, a magnification ratio control unit 32 for accepting entry of the reproduction speed setting key and a read control unit 33 for controlling the reading operation of the speech frame S3 from the memory 14 by the speech decoding unit 15.

The selecting switch determining unit 31, which is implemented by a program-controlled CPU or the like, accepts an input from the selecting switch 42 to determine whether the selecting switch 42 is in the ON state. When it is determined that the selecting switch 42 is in the ON state, the unit 31 enables the magnification ratio control unit 32.

The magnification ratio control unit 32, which is implemented by a program-controlled CPU or the like, determines a speech reproduction speed for the speech reproducing unit 16 based on a speed magnification ratio set by the reproduction speed setting key 43. For example, when setting of a speech reproduction speed is carried out by specifying a fraction of a normal speed and if the set value of the entered reproduction speed setting key 43 is the magnification ratio of n, the speed with which the speech signal S4 is reproduced by the speech reproducing unit 16 is slowed down to one-nth the normal speed. That is, the speech signal S4 is reproduced in a time period n times longer than a normal time period. In other words, an output time of the speech obtained by the reproduction of the speech signal S4 is extended n times that which is required when the speech signal is reproduced at a normal reproduction speed. The magnification ratio control unit 32 outputs a control signal S6, indicative of existence/non-existence and contents of setting of a reproduction speed by the reproduction speed setting key 43, to the read control unit 33.

During normal operation (when receiving no input of the control signal S6 from the magnification ratio control unit 32), read control unit 33, which is implemented by a program-controlled CPU or the like, sequentially reads the leading data on a frame basis (i.e., the oldest frame in the memory) from the memory 14 and shifts the subsequent data to the top of the memory 14. During a speed changing operation (i.e., when receiving an input of the control signal S6 output from the magnification ratio control unit 32), the read control unit 33 also reads one frame of the leading data of the speech data S3 from the memory 14 (i.e., the oldest stored frame) and outputs the read data to the speech decoding unit 15. In this case, however the read control unit 33 deletes n−1 (n being the magnification ratio) speech frames following the speech frame read out of memory 14 and shifts the remaining speech frames to the top of the memory 14. When a speed magnification ratio set by the reproduction speed setting key 43 is n−5, for example, n−4 frames starting at the second frame subsequent to the first frame read out of memory and ending at the fourth frame are deleted. As used herein, the phrase "one frame of data" denotes a single speech frame, which is a unit of information of speech data reproduced by the data processing unit 13. The speech data S3 is read every n frames and decoded by the speech decoding unit 15 through the foregoing operation.

Figure 2:
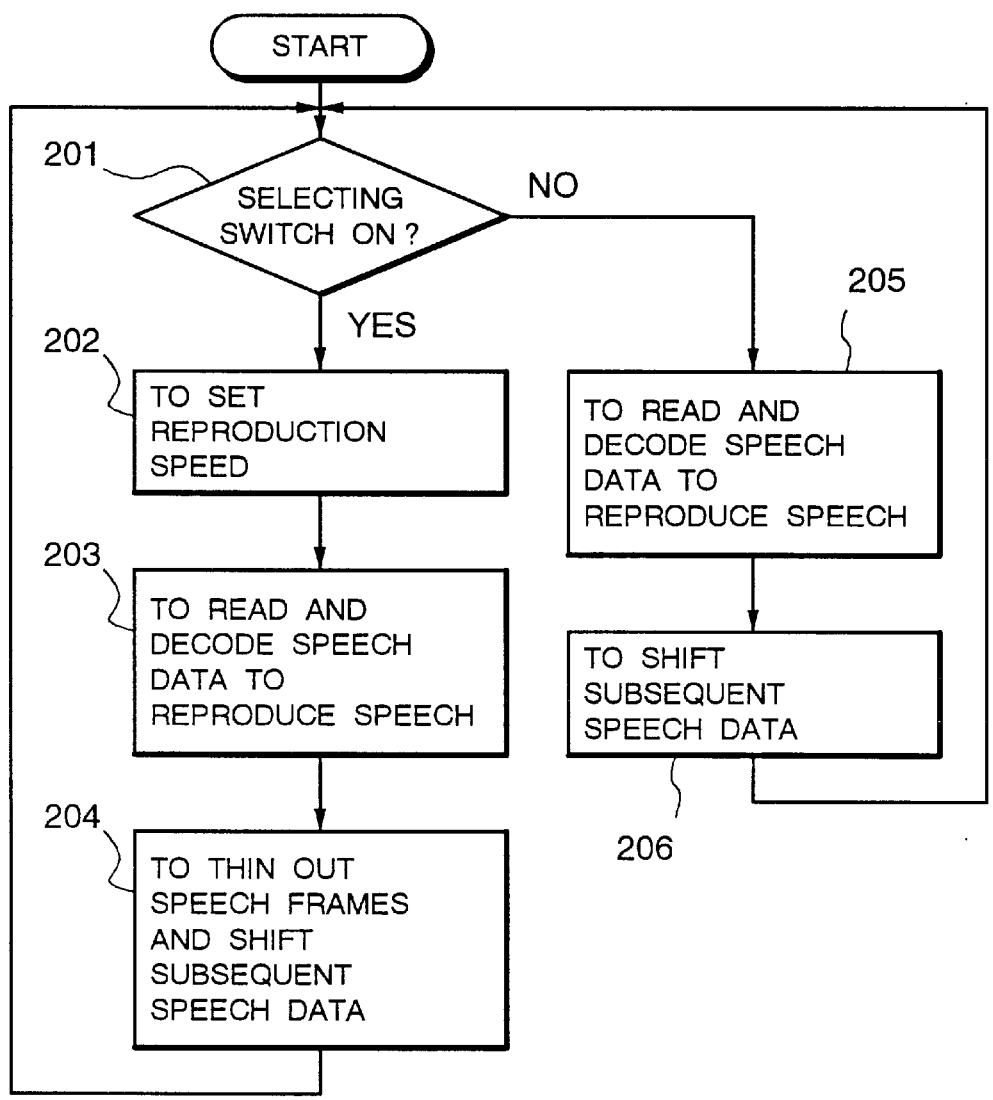
FIG. 2 is a flow chart showing operation of the present embodiment.

Operation of the present embodiment will be described with reference to the flow chart of FIG. 2.

In FIG. 1, the received RF signal S1 is demodulated by the RF processing unit 12, output as the information signal S2 to the data processing unit 13, and then output as the speech data S3 through processing such as equalization and error correction. Determination is made by the selecting switch determining unit 31 whether the selecting switch 42 is in the ON state or not (Step 201). When the determination is made that the selecting switch 42 is in the ON state, the magnification ratio control unit 32 starts control operation (YES at Step 201). Then, the speed magnification ratio n set by the reproduction speed setting key 43 is determined, and the speech decoding unit 15 and the speech reproducing unit 16 are controlled to output the control signal S6 (Step 202).

In the following, each operation will be described with respect to a case where the set value of the reproduction speed setting key 43 is the magnification ratio of 3.

First, the magnification ratio control unit 32 outputs the control signal S6 indicating that a speech reproduction speed is set to the magnification ratio of 3 by the reproduction speed setting key 43. In response to the control signal S6, the read control unit 33 reads one frame of the leading data from the memory 14 and sends it to the speech decoding unit 15, whereby the one frame of speech data S3 is decoded and converted into the speech signal S4 and then sent to the speech reproducing unit 16 by the speech decoding unit 15. Then, the speech signal S4 is reproduced by the speech reproducing unit 16 at one-third the normal reproduction speed and output to the speaker 17 (Step 203).

In addition, two frames (equal to the set magnification ratio 3 minus 1), that is, second and third frames following the read first frame, are deleted from the memory 14 and the subsequent fourth frame is shifted to the top of the memory 14 by the read control unit 33 (Step 204).

The respective processing will be repeated hereafter, determination of the state of the selecting switch 42, setting of a reproduction speed, reading and reproduction of one frame of the speech data S3 from the memory 14 and shifting operation of subsequent data (steps 201 to 204).

In this state, when the selecting switch 42 is turned off, the selecting switch determining unit 31 determines that the selecting switch 42 is in the OFF state to stop operation of the magnification ratio control unit 32. As a result, the magnification ratio control unit 32 fails to output the control signal S6 to the read control unit 33.

At this point, the read control unit 33 starts normal operation, so that the leading data is sequentially read from the memory 14 on a frame basis, the read speech data S3 is decoded by the speech decoding unit 15 and the decoded speech signal S4 is reproduced at a normal reproduction speed by the speech reproducing unit 16 and output through the speaker 17 (Step 205). In addition, the read control unit 33 sequentially shifts each frame subsequent to the read first frame to the top of the memory 14 (Step 206).

The second embodiment of the present invention will be described in the following.

The speech reproducing device of the present embodiment is similarly structured to the speech reproducing device of the first embodiment shown in FIG. 1. The present embodiment only differs in the function of the magnification ratio control unit 32 of the telephone control unit 30 from that of the above-described magnification ratio control unit 32 of the first embodiment. The other components are the same as those in the above-described first embodiment.

Based on a speed magnification ratio set by the reproduction speed setting key 43, the magnification ratio control unit 32 of the present embodiment copies and arranges the speech signal decoded by the speech decoding unit 15 as many as the value of the speed magnification ratio and controls the speech reproducing unit 16 to reproduce the same. At this time, unlike the control by the magnification ratio control unit 32 in the first embodiment, reproduction is carried out at a normal reproduction speed, without changes in the speech reproduction speed of the speech reproducing unit 16.

Figure 3:
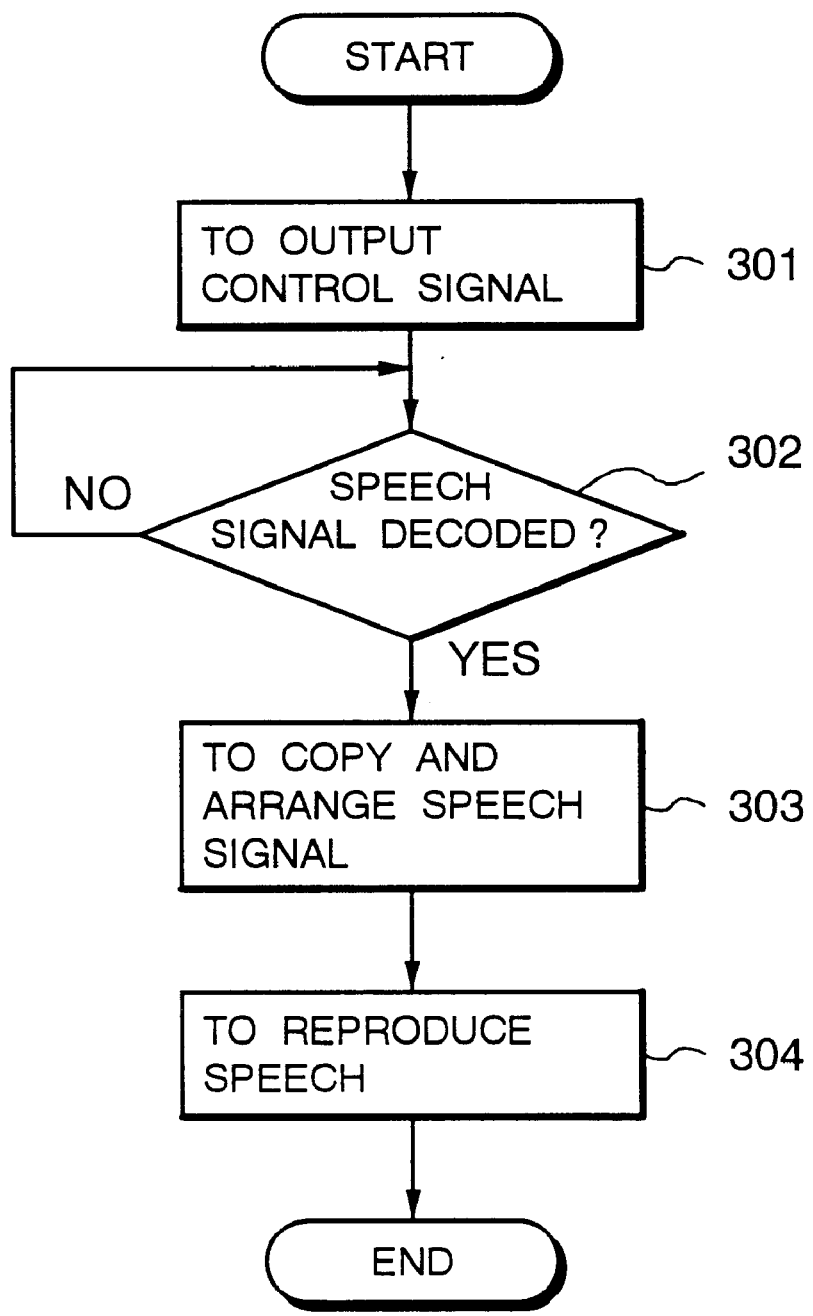
FIG. 3 is a flow chart showing operation of a magnification ratio control unit of a speech reproducing device according to a second embodiment of the present invention.
Figure 4:
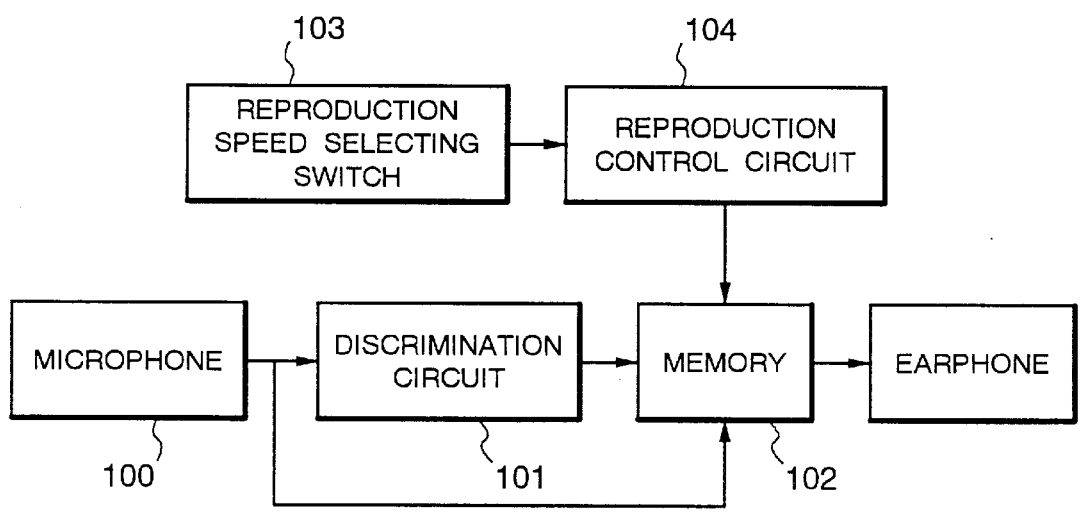
FIG. 4 is a block diagram showing an example of structure of a conventional speech reproducing device.

More specific description will be made, with reference to the flow chart of FIG. 3, of a case where a speech reproduction speed is to be set by specifying a fraction of a normal speed and a set value of the entered reproduction speed setting key 43 is a magnification ratio of n. The magnification ratio control unit 32 first outputs the control signal S6 to wait for the speed data S3 to be read by the read control unit and to be decoded by the speech decoding unit 15 (Steps 301 and 302). When decoding of the speech signal is executed by the speech decoding unit 15, the magnification ratio control unit 32 copies and arranges the decoded speech signal S4 as many as n−1 (Step 303). As a result, the same speech signals S4 as many as the number of n are arranged. Then, the unit 32 controls the speech reproducing unit 16 to reproduce the arranged n speech signals S4 (Step 304). As a result, speech obtained by the reproduction of the speech signal S4 is repeatedly output n times.

In other words, while in the first embodiment a reproduction time of the speech signal S4 is extended to a time corresponding to a set speed magnification ratio, in the present embodiment reproduction of the speech signal S4 is appropriately repeated to output speech based on the speech signal for a desired time period.

As described in the foregoing, in the speech reproducing device of the present invention not all the speech data but several speech frames are written in a memory and thinned out for decoding. Then, a generated speech signal is expanded or the speech signal is repeatedly reproduced to complement speech corresponding to thinned out speech frames. This enables the necessary amount of memory to be reduced to eliminate a shortage of memory capacity caused by overflow speech data, thereby coping with common long-time conversation.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A device for reproducing speech from a received radio frequency signal, said device comprising:

(A) data processing means for processing a received radio frequency signal representative of a conversation, said data processing means processing said received radio frequency signal to generate speech data comprising a plurality of consecutive speech frames, each of said speech frames being representative of a respective time segment of said received radio frequency signal, each of said time segments being of equal length;

(B) storing means for storing each consecutive said speech frame generated by said data processing means;

(C) selecting means for selecting a magnification ratio indicative of the speed at which said conversation is to be reproduced; and (D) sound reproduction means for reproducing said conversation, said sound reproduction means comprising:

(1) deleting means for deleting a number of speech frames, and therefor a segment of said conversation, stored in said storing means at a rate which is determined by said magnification ratio, whether or not a given set of speed frame is deleted being independent of whether or not a segment of said conversation corresponding to said set of speech frames corresponds to a silent portion of said conversation; and (2) reproducing means for reproducing said conversation by converting those of said speech frames which are not deleted into an audible signal.

2. The speech reproduction device of claim 1, wherein said selecting means permits an operator to select said magnification ratio.

3. The speech reproduction device of claim 1, wherein said magnification ratio is other than 1.

4. The speech reproduction device of claim 1, wherein said reproducing means sequentially converts the oldest speech frame stored in said storing means into an audible signal.

5. The speech reproduction device of claim 4, wherein said deleting means deletes n consecutive speech frames stored in said storing means each time said reproducing means converts the oldest speech frame into an audible signal, n being equal to said magnification ratio.

6. The speech reproduction device of claim 5, wherein said n consecutive speech frames are the n consecutive speech frames immediately following said reproduced oldest speech frame.

7. A process for reproducing speech from a received radio frequency signal, said process comprising:

(A) processing a received radio frequency signal representative of a conversation so as to generate speech data comprising a plurality of consecutive speech frames, each of said speech frame being representative of a respective time segment of said received radio frequency signal, each of said time segments being of equal length;

(B) storing each consecutive said speech frame generated by said data processing means; and (C) reproducing said conversation by:

(1) deleting a number a of said stored speech frames, and therefore a segment of said conversation, at a rate which is determined by a magnification ratio indicative of the speech at which said conversation is to be reproduced, said speed being independent of whether or not said segment of said conversation corresponds to a silent portion of said conversation;

(2) reproducing said conversation by converting those of said speech frames which are not deleted into an audible signal.

8. The method of claim 7, wherein said magnification ratio is other than 1.

9. The method of claim 8, further including the step of selecting said magnification ratio.

10. The method of claim 7, wherein said audible signal is generated by converting the oldest speech frame stored in said storing means into said audible signal.

11. The method of claim 10, wherein small end consecutive stored speech frames are deleted each time the oldest speech frame is converted into an audio signal, and being equal to said magnification ratio.

12. The method of claim 11, wherein said end consecutive speech frames are the end consecutive speech frames immediately following said reproduced oldest speech frame.

* * * * *